US009254733B2

(12) United States Patent
Costigan et al.

(10) Patent No.: US 9,254,733 B2
(45) Date of Patent: Feb. 9, 2016

(54) AUTOMOTIVE GLASS CHANNEL AND METHOD

(71) Applicant: GM GLOBAL TECHNOLOGY OPERATIONS LLC, Detroit, MI (US)

(72) Inventors: Terrence P. Costigan, Fenton, MI (US); James K. Platt, Flushing, MI (US); Michael Alhof, Flörsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/304,291

(22) Filed: Jun. 13, 2014

(65) Prior Publication Data

US 2015/0015023 A1   Jan. 15, 2015

Related U.S. Application Data

(60) Provisional application No. 61/844,614, filed on Jul. 10, 2013.

(51) Int. Cl.
*E05F 15/08*   (2006.01)
*B60J 5/04*   (2006.01)

(52) U.S. Cl.
CPC .............. *B60J 5/0468* (2013.01); *B60J 5/0402* (2013.01); *B60J 5/0419* (2013.01); *B60J 5/0463* (2013.01); *Y10T 29/49622* (2015.01)

(58) Field of Classification Search
CPC ......... E05D 15/10; E05D 11/38; E05D 15/08; E05D 15/16; E05D 7/16; E06B 3/00
USPC ..................... 49/348, 349, 212, 506, 440, 441
See application file for complete search history.

(56) References Cited

U.S. PATENT DOCUMENTS

| | | | |
|---|---|---|---|
| 2,449,210 A | 9/1948 | Faust | |
| 4,956,942 A * | 9/1990 | Lisak et al. | 49/502 |
| 5,622,005 A * | 4/1997 | Ochenski et al. | 49/375 |
| 5,694,719 A | 12/1997 | Bejune et al. | |
| 5,855,095 A * | 1/1999 | Dedrich et al. | 49/502 |
| 5,867,942 A * | 2/1999 | Kowalski | 49/502 |
| 5,927,021 A * | 7/1999 | Kowalski et al. | 49/502 |
| 5,960,588 A * | 10/1999 | Wurm et al. | 49/352 |
| 6,301,835 B1 * | 10/2001 | Pfeiffer et al. | 49/502 |
| 6,561,567 B2 * | 5/2003 | Mrozowski et al. | 296/146.5 |
| 7,246,464 B2 * | 7/2007 | Castellon | 49/212 |
| 8,069,610 B2 * | 12/2011 | Graf et al. | 49/348 |
| 8,127,493 B2 * | 3/2012 | Cappelli et al. | 49/212 |
| 8,209,910 B2 | 7/2012 | Eckart et al. | |
| 8,397,433 B2 * | 3/2013 | Holmes | 49/502 |
| 8,561,350 B2 * | 10/2013 | Cardine et al. | 49/212 |

(Continued)

FOREIGN PATENT DOCUMENTS

| | | |
|---|---|---|
| CN | 1458005 A | 11/2003 |
| CN | 101120856 A | 2/2008 |

(Continued)

*Primary Examiner* — Jerry Redman
(74) *Attorney, Agent, or Firm* — Quinn Law Group, PLLC

(57) ABSTRACT

A door assembly includes an inner panel and an outer panel that cooperate to define a door cavity therebetween and a window frame that defines a window opening. The door assembly further includes a division post defining a glass run channel extending from the window opening into the door cavity. A bracket member is rotatably connected to the division post.

11 Claims, 3 Drawing Sheets

(56) References Cited

U.S. PATENT DOCUMENTS

| | | | |
|---|---|---|---|
| 8,646,209 B2* | 2/2014 | Hampel et al. | 49/212 |
| 2006/0032141 A1* | 2/2006 | Daumal Castellon | 49/212 |
| 2006/0185247 A1* | 8/2006 | Bigourden | 49/349 |
| 2006/0254146 A1* | 11/2006 | Florentin et al. | 49/349 |
| 2007/0163177 A1* | 7/2007 | Heyer et al. | 49/348 |
| 2007/0169415 A1* | 7/2007 | Jain | 49/348 |
| 2007/0262607 A1 | 11/2007 | Saito | |
| 2011/0011005 A1 | 1/2011 | Halliwell et al. | |
| 2015/0108785 A1 | 4/2015 | Yokota | |

FOREIGN PATENT DOCUMENTS

| | | |
|---|---|---|
| CN | 101311491 A | 11/2008 |
| DE | 102005057708 A1 | 6/2007 |
| FR | 1197209 A | 11/1959 |
| FR | 2872094 A1 | 12/2005 |
| GB | 1098723 A | 1/1968 |
| JP | 2003048427 A | 2/2003 |

* cited by examiner

AUTOMOTIVE GLASS CHANNEL AND METHOD

CROSS-REFERENCE TO RELATED APPLICATION

This application claims the benefit of U.S. Provisional Patent Application No. 61/844,614, filed Jul. 10, 2013, and which is hereby incorporated by reference in its entirety.

TECHNICAL FIELD

This disclosure relates to glass run channels for vehicle doors.

BACKGROUND

A vehicle door typically includes a window that is selectively movable between an open position and a closed position. In the closed position, the window completely obstructs a window opening. In the open position, at least part of the window opening is unobstructed. The door typically includes glass run channels that guide the movement of the window between the open and closed positions. More specifically, the glass run channels restrict the fore/aft and inboard/outboard movement of the window, while permitting up and down movement between the open and closed positions.

SUMMARY

A door assembly includes an inner panel and an outer panel that cooperate to define a door cavity therebetween and a window frame that defines a window opening. The door assembly further includes a division post defining a glass run channel extending from the window opening into the door cavity. A bracket member is rotatably connected to the division post.

The bracket assembly facilitates the installation of the division post in a vehicle door because the bracket member may be rotated to a first position in which the bracket member is generally parallel with the division post and a second position in which the bracket member is generally perpendicular to the division post; the first position of the bracket member reduces interference between the bracket assembly and the inner panel as the division post and bracket assembly are inserted into the door cavity through the slot at the door's belt line, and the second position enables the bracket member to extend to the inner panel for securing the division post once the division post is in its installed position in the door.

A corresponding division post assembly and method are also provided.

The above features and advantages and other features and advantages of the present disclosure are readily apparent from the following detailed description of the best modes for carrying out the disclosure when taken in connection with the accompanying drawings.

DETAILED DESCRIPTION

Figure 1:
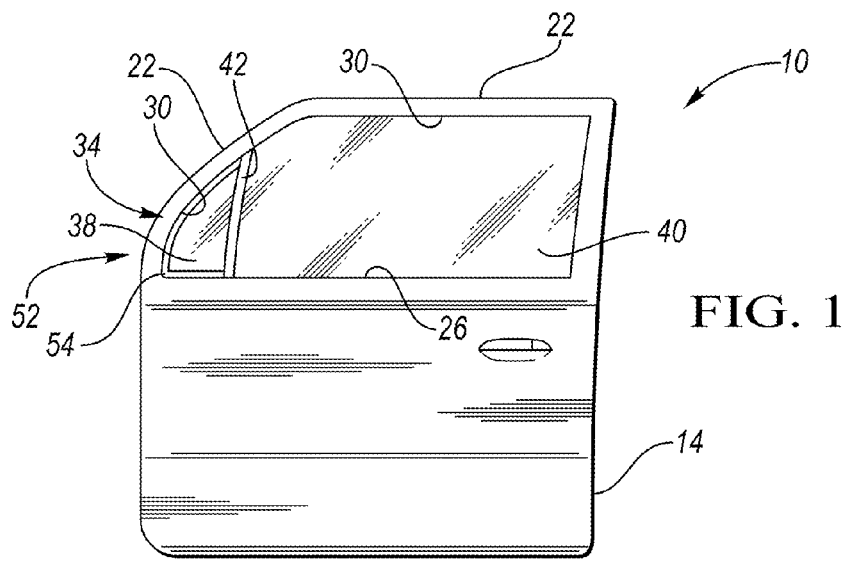
FIG. 1 is a schematic side view of a vehicle door including a division post.

Referring to FIG. 1, a vehicle door 10 is schematically depicted. The vehicle door 10 includes an outer panel 14 that defines the exterior surface of the door 10. The outer panel 14 cooperates with an inner panel (shown at 18 in FIG. 2) to define a window frame 22. The window frame 22 and the belt line 26 of the door 10 define a window opening 30. The door 10 includes a window assembly 34 having a fixed window pane 38 and a movable window 40. The fixed window pane 38 is fixed and is not movable with respect to the inner panel 18 and the outer panel 14, and, in the embodiment depicted, obstructs the forward portion of the window opening 30. A division post 42 separates the fixed window pane 38 and the movable window 40.

Figure 2:
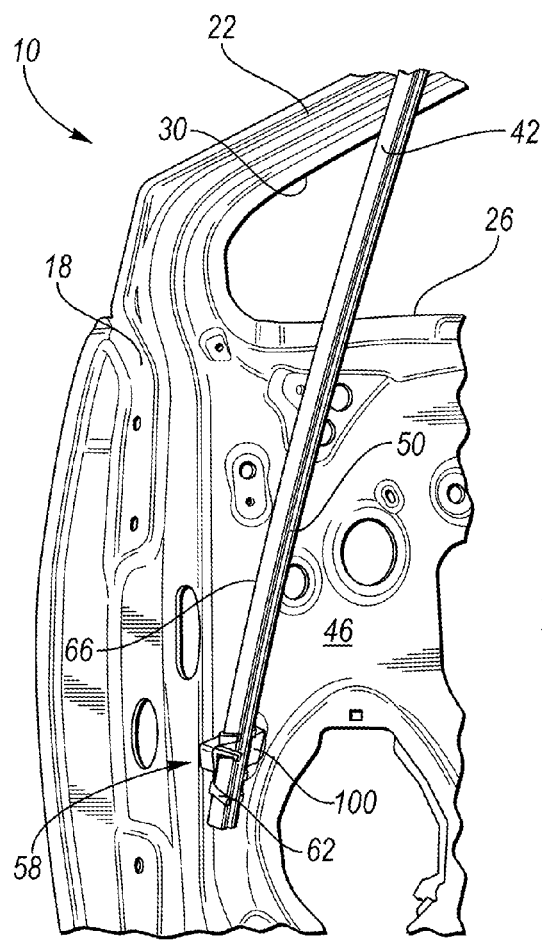
FIG. 2 is a schematic side view of the inner panel of the vehicle door of FIG. 1.

Referring to FIGS. 1 and 2, the inner and outer panels 14, 18 cooperate to define a door cavity 46 therebetween and below the belt line 26. The movable window 40 is movable between a closed position, as shown in FIG. 1, in which the movable window 40 cooperates with the fixed pane 38 to obstruct the window opening 30, and an open position in which the movable window 40 descends into the door cavity 46 and leaves at least some of the opening 30 unobstructed.

To guide the movement of the window 40 up and down between the open and closed positions, the door 10 includes two glass run channels; the division post 42 forms the entire front glass run channel 50. It should be noted that, in the embodiment depicted, the division post 42 includes a single piece of material that extends from the lowest extent of the channel 50 inside the door cavity 46, through the slot at the belt line 26, across the window opening 30, to the window frame 22.

In the embodiment depicted, the division post 42 is part of a preassembled module 52 (i.e., preassembled prior to installation in the door 10) that includes the fixed window pane 38, a frame and seal assembly 54 around the fixed pane 38, and a mounting bracket assembly 58; however, the division post 42 may or may not be sub-assembled to the fixed pane 38 and the frame and seal assembly 54 within the scope of the claims. The mounting bracket assembly 58 includes a fixed portion, i.e., a base member 62, that is mounted to the lower end of the division post 42 such that the base member 62 is stationary (i.e., non-rotatable) with respect to the division post 42.

Figure 3:
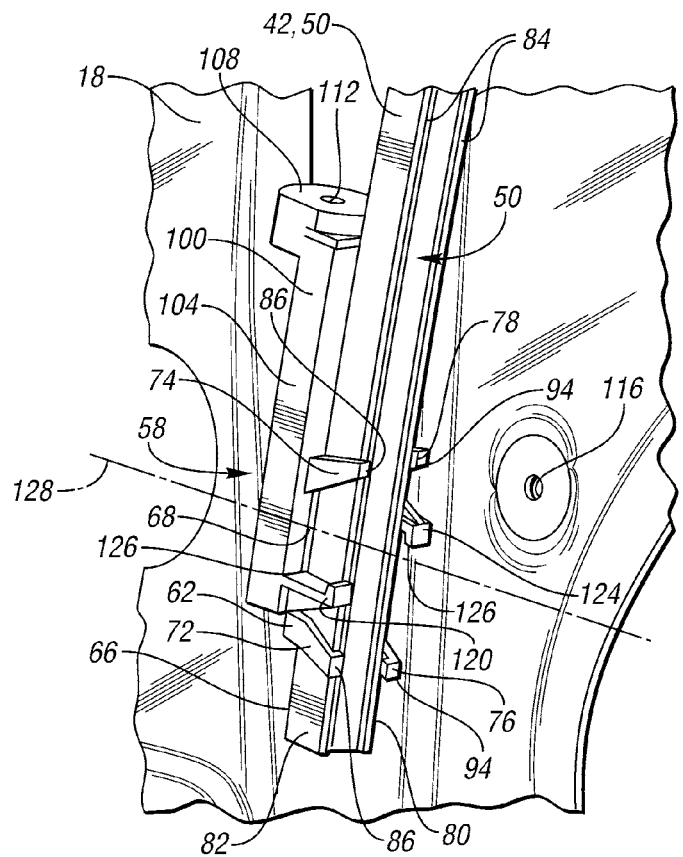
FIG. 3 is a schematic, perspective view of a bracket member connected to the division post in a first position.
Figure 4:
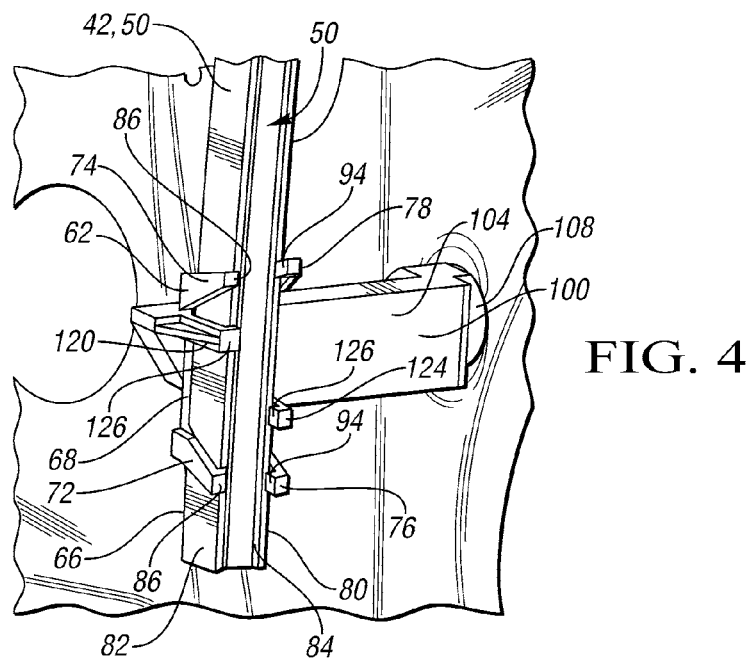
FIG. 4 is a schematic, perspective view of the bracket member of FIG. 3 in a second position.

Referring to FIGS. 3 and 4, the base member 62 includes a base segment 68 that abuts the forward surface 66 of the division post 42. The fixed portion also includes four stabilizing legs 72, 74, 76, 78 that protrude from the base segment 68. The division post 42 includes an inboard surface 80 that is generally perpendicular to the forward surface 66, an outboard surface 82 that is also generally perpendicular to the forward surface 66, and a rearward surface 84. The rearward surface 84 defines the groove that functions as the glass run channel 50; the forward edge of the window 40 is disposed within the groove defined by the rearward surface 84, as shown in FIG. 1.

Legs 72, 74 extend from the base segment 68 and contact outboard surface 82. The terminal ends 86 of legs 72, 74 contact portions of rearward surface 84. Legs 76, 78 extend from the base segment 68 and contact inboard surface 80. The terminal ends 94 of legs 76, 78 contact portions of rearward surface 84. Accordingly, legs 72, 74, 76, 78 prevent relative movement of the base member 62 relative to the division post 42.

The bracket assembly 58 also includes a movable portion, i.e., bracket member 100, that is mounted with respect to the division post 42 via the base member 62, and that is selectively rotatable with respect to the base member 62 and the division post 42 between a first, staged position (as shown in FIG. 3) and a second, installed position (as shown in FIG. 4). In the embodiment depicted, the bracket member 100 is mounted with respect to the base member 62 via a pivot pin (not shown). The bracket member 100 includes a generally linear segment 104 and a nut segment 108 at one end of the linear segment 104. The nut segment 108 defines an internally-threaded hole, i.e., first hole 112. The nut segment 108 may, alternatively, form a J-nut.

Referring specifically to FIG. 3, when the bracket member 100 is in the first, staged position, the generally linear segment 104 is generally parallel with the division post 42. Along its entire length, the generally linear segment 104 abuts, and/or is in juxtaposition with, the forward surface 66 and the base segment 68 of the base member 62. In the first, staged position, the bracket assembly 58 is compact and minimizes inboard/outboard packaging space, which facilitates installation of the fixed pane 38 to the window frame 22 by reducing or eliminating interference between the bracket assembly 58 and the inner panel 18 belt structure (at belt line 26).

Referring specifically to FIG. 4, when the bracket member 100 is in the second, installed position, the linear segment 104 is rotated approximately ninety degrees from the first, staged position, and is therefore generally perpendicular to the division post 42. The nut segment 108 abuts the inner panel 18 such that the first hole 112 is aligned with a second hole (shown at 116 in FIG. 3) in the inner panel 18. A threaded fastener (not shown) such as a bolt is then driven through both holes 112, 116 to secure the bracket assembly 58, and, accordingly, the division post 42, to the inner panel 18. Any other suitable type of fastener can be used, such as, but not limited to, a screw, a U-nut, a nut thread, a rivet, or a clip.

The bracket member 100 includes two legs, namely first leg 120 and second leg 124, to limit rotation of the bracket member 100 relative to the base member 62 and the division post 42. More specifically, legs 120, 124 extend from the generally linear segment 104. Referring again to FIG. 3, when the bracket member 100 is in the first, staged position, leg 120 contacts the outboard surface 82 of the division post 42, and leg 124 contacts the inboard surface 80 of the division post 42. Leg 120 is below the axis of rotation 128 of the bracket member 100, whereas leg 124 is above the axis of rotation of the bracket member 100.

Accordingly, interference between leg 120 and surface 82 and between leg 124 and surface 80 prevents rotation of the bracket member 100 in a first rotational direction (i.e., such that the nut segment 108 moves away from the inner panel 18). However, due to the offset of the legs 120, 124 from the axis of rotation, there is no interference between the legs 120, 124 and surfaces 80, 82 that prevents rotation of the bracket member 100 in a second rotational direction (opposite the first direction) from the first, staged position.

As the bracket member 100 is rotated in the second rotational direction from the first position toward the second position, leg 120 moves out of contact with surface 82, and leg 124 moves out of contact with surface 80. However, and with reference to FIG. 4, when the movable portion is in the second position, leg 120 again contacts surface 82 and leg 124 again contacts surface 80, thereby preventing further rotation of the movable member 100 in the second rotational direction and maintaining the movable member in the second position. Each leg 120, 124 includes a respective tab 126 at their respective ends. The tabs 126 are angled such that, when the bracket member 100 is in the second, installed position, each tab 126 contacts rearward surface 84 of the division post 42. Accordingly, the legs 120, 124 function as the primary retention features between the division post 42 and the bracket member 100 of the bracket assembly 58.

The bracket assembly 58 thus enables the use of a single-piece division post 42 that extends from the window frame 22 to the lower terminus of the glass run channel because the bracket assembly 58 effectively connects the division post 42 to the inner panel 18 when the bracket member 100 is in the second, installed position while also providing sufficient maneuverability of the division post 42 within the door cavity 46 during installation of the fixed window pane 38 and frame seal assembly 54 to the window frame 22 when the movable member 100 is in the first, staged position.

More specifically, the bracket member 100 is in the first position when the division post 42 and bracket assembly 58 are inserted into the door cavity through the relative narrow slot formed between the inner panel 18 and the outer panel 14 at the belt line 26; the bracket member 100 being in the first position enables the bracket assembly 58 to fit through the relative narrow slot formed between the inner panel 18 and the outer panel 14 at the belt line 26. The bracket member 100 is then moved to the second position to connect the division post 42 to the inner panel 18. A continuous channel 50, created by the full-length division post 42, may also aid express glass operation and improve operator access to the front of the door for electrical harness installation.

Figure 5:
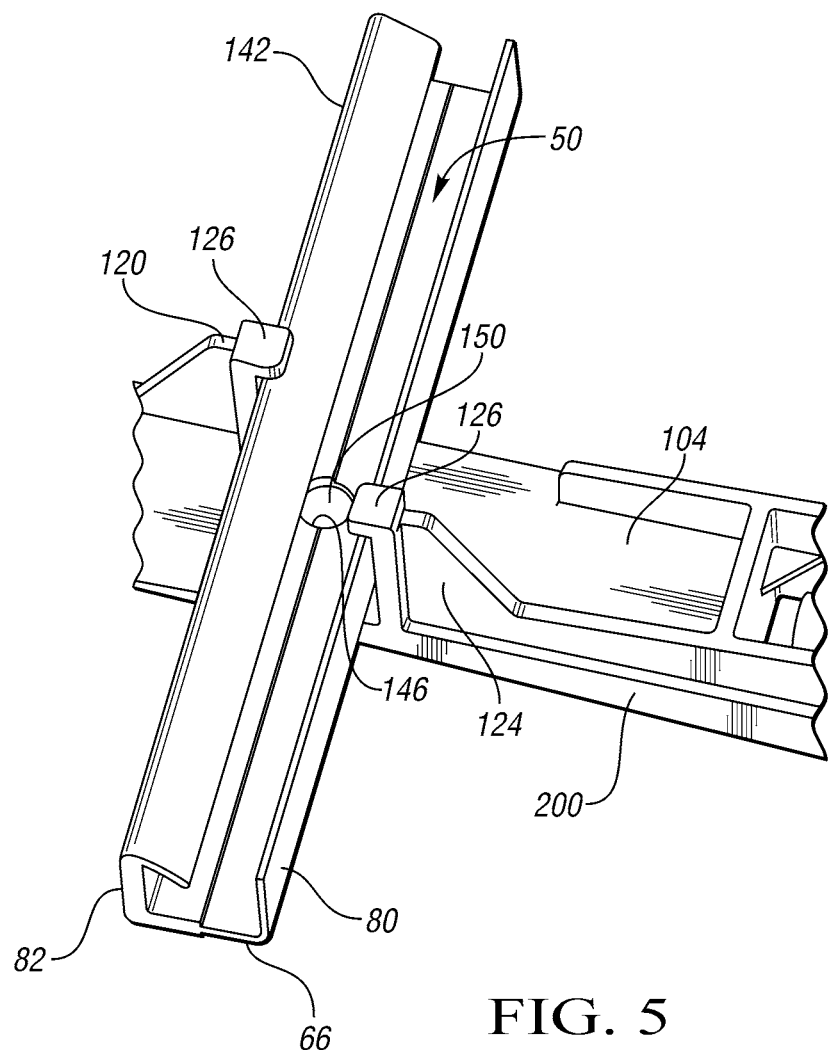
FIG. 5 is a schematic, perspective view of an alternative division post and bracket in accordance with the claims.

Referring to FIG. 5, wherein like reference numbers refer to like components from FIGS. 1-4, an alternative division post 142 and bracket member 200 are schematically depicted. The division post 142 is substantially identical to the division post shown at 42 in FIGS. 1-4, except for a hole 146 formed by the forward surface 66. The bracket member 200 is substantially similar to the bracket member 100 of FIGS. 2-4 except that it is rotatably connected directly to the division post 142 without an intervening base member (such as the one shown at 62 in FIGS. 2-4). More specifically, the bracket member 200 includes a generally cylindrical protrusion 150 that is snap-fit into the hole 146 and that acts as a pivot about which the bracket member 200 is rotatable between its first and second positions.

While the best modes for carrying out the disclosure have been described in detail, those familiar with the art to which this disclosure relates will recognize various alternative designs and embodiments for practicing the disclosure within the scope of the appended claims.

The invention claimed is:

1. A door assembly comprising:
   an inner panel;
   an outer panel;
   the inner panel and the outer panel cooperating to define a door cavity there between, and a window frame that defines a window opening;
   a division post defining a glass run channel extending from the window opening into the door cavity;
   a bracket member being directly connected to the division post and rotatable with respect to the division post to a final position; and
   wherein the bracket member defines a first hole;
   wherein the inner panel defines a second hole;
   a fastener extending through the first and second holes.

2. The door assembly of claim 1,
   wherein the first hole is aligned with the second hole.

3. The door assembly of claim 1, wherein the bracket member is selectively rotatable with respect to the division post about an axis of rotation between a first position in which the bracket member is substantially parallel with the division post, and a second position in which the bracket member is generally perpendicular to the division post.

4. The door assembly of claim 3, wherein the bracket member is configured such that the bracket member is prevented from moving in a first rotational direction when the bracket member is in the first position; and
wherein the bracket member is configured such that the bracket member is prevented from moving in a second rotational direction when the bracket member is in the second position.

5. The door assembly of claim 4, wherein the division post has an inboard surface and an outboard surface;
wherein the bracket member includes a first leg and a second leg;
wherein the first leg contacts the outboard surface of the division post, and the second leg contacts the inboard surface when the bracket member is in the first position.

6. The door assembly of claim 5, wherein the first leg is below the axis of rotation and the second leg is above the axis of rotation when the bracket member is in the first position.

7. A method comprising:
providing a division post having a bracket member rotatably connected thereto for selective movement between a first position in which the bracket member is generally parallel with the division post, and a second position in which the bracket member is generally perpendicular to the division post;
inserting the division post between an inner panel and an outer panel of a door assembly at a window opening with the bracket member in the first position; and
rotating the bracket member with respect to the division post to the second position when the bracket member is between the inner panel and the outer panel.

8. The method of claim 7, wherein the bracket member includes a nut segment that defines a first hole;
wherein the inner panel defines a second hole; and
wherein the first hole is aligned with the second hole when the bracket member is rotated to the second position.

9. The method of claim 8, further comprising extending a fastener though the first hole and the second hole to secure the bracket member to the inner panel.

10. A division post assembly comprising:
a division post defining a glass run channel; and
a bracket member being rotatably connected to the division post;
wherein the bracket member is selectively rotatable with respect to the division post about an axis of rotation between a first position in which the bracket member is substantially parallel with the division post, and a second position in which the bracket member is generally perpendicular to the division post; wherein the division post has a first surface and a second surface;
wherein the bracket member includes a first leg and a second leg;
wherein the first leg contacts the first surface of the division post, and the second leg contacts the second surface when the bracket member is in the first position; and
wherein the first leg is on one side of the axis of rotation and the second leg is on another side of the axis of rotation when the bracket member is in the first position.

11. The division post assembly of claim 10, wherein the division post defines a division post hole; and
wherein the bracket member defines a cylindrical protrusion that extends through the division post hole and thereby acts as a pivot about which the bracket member is rotatable with respect to the division post.

* * * * *